Sept. 5, 1933.    J. MELLOR    1,925,268
PACKING RING AND PACKING
Filed Nov. 16, 1927
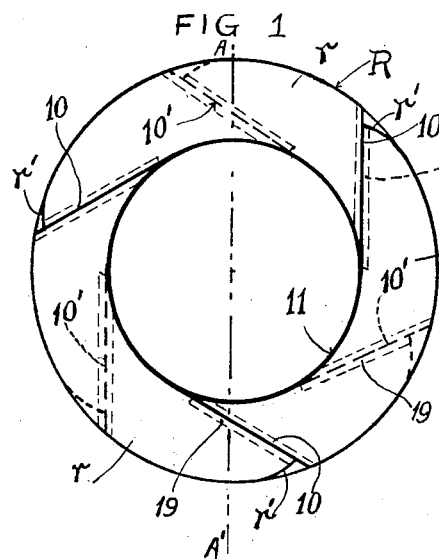
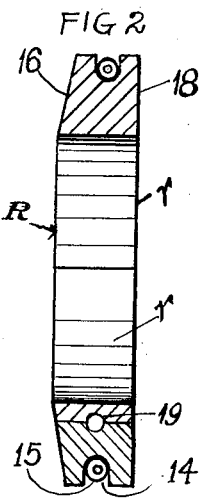
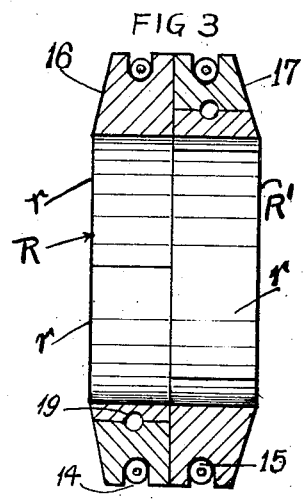
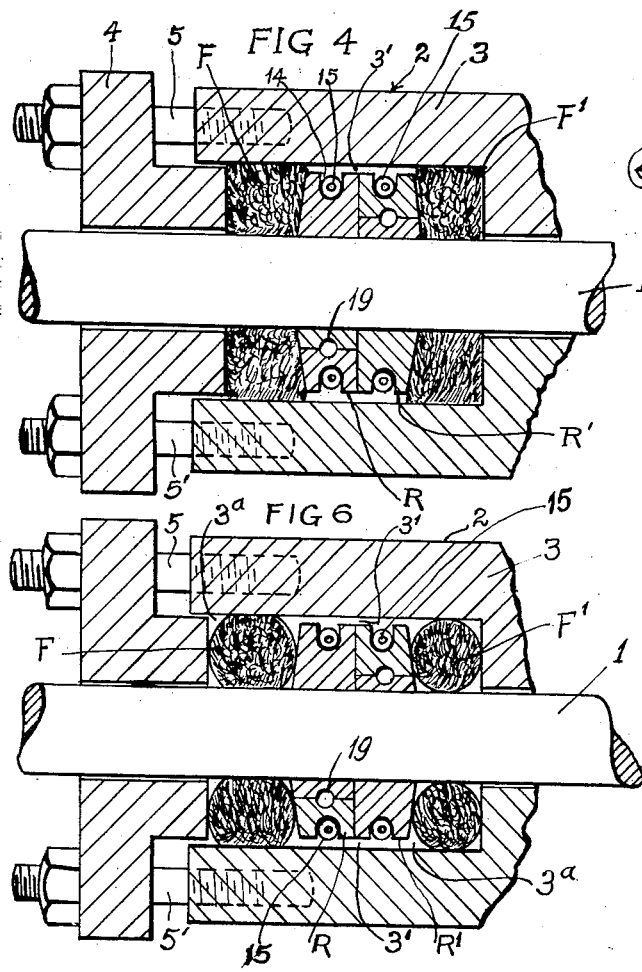
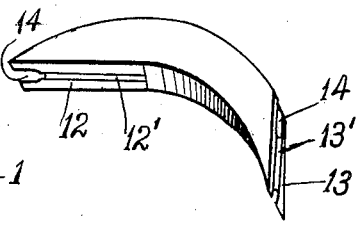
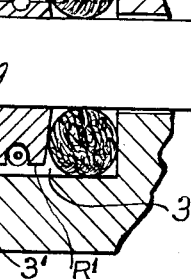
INVENTOR
John Mellor
BY
Joseph F. O'Brien
ATTORNEY Patented Sept. 5, 1933

1,925,268

UNITED STATES PATENT OFFICE 1,925,268

PACKING RING AND PACKING

John Mellor, Bayhead, N. J.

Application November 16, 1927
Serial No. 233,628

6 Claims. (Cl. 286—25)

This invention relates to improvements in packing rings and packing.

One of the objects of this invention is to produce a metallic packing ring having segments divided to provide abutting surfaces tangential to the bore of the ring and thus to enable increased expansion and contraction or relative movement of the segments to compensate for wear, irregular movement of the packed member or irregularity in such member, combined with means whereby such compensating movement may, in the setting or tightening or adjustment of the ring on the member, be accomplished by external pressure.

Another object of the invention is to produce a packing which will be capable of initial tightening or setting through the application of external pressure and, furthermore, will have sufficient flexibility to maintain its tightness and still to compensate for any irregular movement of the member to be packed or irregularities therein.

Another object of the invention is to provide metallic expansible and contractable rings of the type hereinabove specified which will be capable of use with a ring of compressible material such as fibrous packing rings for initial adjustment or setting of the packing.

Another object of my invention is to provide a metallic packing ring which will be automatic in expansion and contraction with freedom to move in any direction to compensate for the irregularities of movement of rod or shaft surfaces, and, at the same time, in combination with a fibrous ring or rings will provide a means by which the packing adjustment may be controlled externally of the box and independently of the automatic feature of the metallic ring.

Another object of the invention is to produce a ring of the tangentially-divided type specified which will be capable of automatic adjustment by radial pressure from a circumferentially-disposed spring, in combination with the initial adjustment by external pressure.

Another object of the invention is to produce a packing by the use of which external pressure axially applied may be resolved into components of axial and radial pressures with the axial component comprising a major proportion of the applied pressure and the radial pressure a minor proportion thereof.

Another object of the invention is to provide a packing composed partly of rings of rigid material, such as Babbitt metal, bronze or other non-ferrous metal and partly of rings of soft material, such as a fibrous composition, asbestos, rubber composition and the like, the metallic packing rings having angular sides capable of resolving liquid pressures, such as hydraulic pressure, to produce a tight seal between the metallic ring and the member and a tight seal between the soft packing and the box.

Another object of the invention is to produce a packing of this combination soft and hard material which will reduce the radial pressure of the soft packing material on the member and transfer it against the box so as to avoid scoring of the said member.

Another object of the invention is, in a liquid pressure device, to provide a cushion against such liquid pressures between the metallic rings and the gland or follower.

Another object of the invention is to provide means for causing accurate registration of the segmental parts of the ring, guiding the sliding movement of adjacent surfaces, and providing an additional seal by breaking up the flat sliding and sealing surfaces and also providing a more simple, practical and economical method of manufacture.

Another object of the invention is to so form the ends of the abutting surfaces of the segments as to avoid projection of one of the parts beyond the circumference of the other during expanding and contracting movement in compensating for irregularities or due to wear.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawing, in which:—

Fig. 1 is a view, in side elevation, of a metallic packing ring embodying my invention;

Fig. 2 is a section on the line A—A' of Fig. 1;

Fig. 3 is a similar section through a double ring embodying my invention;

Fig. 4 is a central, longitudinal section through a stuffing box packed with metallic and fibrous rings in accordance with my invention and maintained under pressure by the gland;

Fig. 5 is a perspective view of one of the segments of the rings shown in Figs. 1 to 3; and Fig. 6 is a section similar to Fig. 4, showing the condition of the metallic and fibrous rings before pressure is applied by the gland.

Referring now to the drawing, which illustrates a preferred embodiment of my invention, 1 indicates a member to be packed which may be a rotating or reciprocating member; 2 is a stuffing box surrounding the member 1 and comprising a body portion 3 open at one end and a gland 4 arranged to close the open end and by screw pressure derived from bolts 5, 5' screwthreaded in said body portion 3, to apply pressure on the packing contained within the packing chamber 3ª of the stuffing box.

Within the chamber 3ª surrounding the member 1, I provide a pair of segmental rings R, R' of a hard or rigid material such as Babbitt-metal or bronze and these rings are preferably arranged between rings F, F' of a soft material such as fibre composition, asbestos, rubber composition or the like. The rings R, R' are preferably employed in pairs, as illustrated, though in some cases a single ring may be utilized. Each member of the pair of rings R, R' is composed or divided into a plurality or series of segments r, the rings shown in the drawing being divided into three segments. Each of said rings is so divided along rectilinear lines 10 which are tangential to the inner arcuate surface or bore 11 of the ring, such division providing, on each segment, plane contact surfaces 12 and 13 so disposed that the abutting, contact surfaces of adjacent segments will, during expansion and contraction of the ring, slide along each other. The contact-surface of one segment will have a movement contrarily to the abutting surface of the adjacent segment, while still maintaining contact, it being understood that this relative sliding movement of the segments will, during irregular movement of the member 1, enable the maintenance of contact with the periphery of said member and also between the abutting surfaces of the adjacent segments, the ring contracting and expanding in order to compensate for any irregularities of movement of the said member and for any irregularities in the surface of the member as well as for wear of the packing or member. This tangential division along rectilinear lines or planes tangential to the inner bore of the ring produces abutting ends of increased length or surface, one of which cuts the outer periphery at an acute angle and in compensating tends to move outwardly while the other abutting end is obtuse and tends to move inwardly, and this division thus enables increased expanding and contracting movement of the segments.

In the preferred embodiment shown, I have cut away a portion of the acute-angled, outwardly-movable end r' of each of the segments to shorten or reduce the length thereof so that when, owing to wear of the ring or irregularity of the movement of the member 1, the adjacent surfaces are moved contrarily, this acute-angled end r' will not project beyond the abutting end of the adjacent segment.

In order to hold the segments together initially and to enable the said ring to be automatically adjustable or capable of automatic adjustment on the member, I surround the segments with a circumferentially-disposed spring. As shown, I form in the circumference of the segmental ring a spring-groove 14 and apply in said groove a spring 15 which not only holds the parts initially together, but applies radial pressure on the segments so as to make the same automatically adjustable.

My rings R, R' are, as aforesaid, preferably used in pairs to enable the offsetting of the joints and thus to procure a better sealing effect; and in Fig. 1, I have at 10 shown, in full lines, the position of the joints between segments of one ring and at 10' have shown in dotted lines the offset joints in the mating ring. In Figs. 3, 4 and 5, I have also shown mating rings arranged with their joints so offset, while in Fig. 2 I have shown a single ring which, in some conditions, may be employed without the use of a mating ring therewith.

In the preferred embodiment of my invention illustrated, I also provide a bevelled surface at one or both sides of a ring or pair of rings. This bevelling of the ring has two functions. Thus, while my ring hereinabove described is capable of automatic adjustment by the radial pressure of the spring 15, the bevelled surface also provides means for procuring an adjustment or tightening of the packing by external pressure applied axially. Thus, as illustrated, I bevel the external side faces 16 and 17 when a pair of rings are employed, and when a single ring is used, one side 16 is bevelled, while the other side 18 is formed perpendicular to the axis of the ring, or both sides 16 and 18 may be bevelled if so desired. The inclination of this bevel is from the inner arcuate surface or bore of the ring toward the outer circumference or periphery thereof and the angularity of the bevel is preferably so disposed as to enable the external axially-applied pressure from the gland to be resolved into components of axial and radial pressures with the axial component comprising a major proportion of the applied pressure and the radial pressure a minor proportion thereof, thus causing a relatively light radial pressure to be applied for pressing the segments into contact with the member 1. The bevelled surface, furthermore, directs the course during pressure of the soft material of the sealing rings F, F' and causes the same to be denser at and near the inner arcuate surface of the stuffing box, while being relatively loose adjacent to the member thus effectively sealing the space or passage 3' around the periphery of the rings R, R' within the stuffing box. This space is especially provided so that the rings R, R' which are constructed of rigid material will be permitted to have radial movement in the stuffing box and thus to follow any irregular movement of the member 1 without interfering therewith or causing any damage due to a rigid jamming of the rings against the said member and also to permit a contracting and expanding movement of the segments to compensate for wear and for irregularities in the member or in the movement thereof.

In Figs. 4 and 6, I have shown a member 1 packed with a pair of rings R, R' and with fibrous rings on opposite sides thereof. Fig. 6 shows the rings after their insertion but before pressure is applied, while Fig. 4 shows the same rings after pressure has been applied by the gland.

It will be seen that the pressure applied by the gland will, due to the bevelled surfaces 16 and 17, cause the segments to be initially tightened on the member 1; that this bevel also causes the major proportion of the pressure on the fibrous rings F, F' to be exerted toward the periphery thereof; that this causes a thorough sealing between the arcuate inner surface of the stuffing box and the rings, sealing the space 3' while the segments of the rigid material are forced with a relatively light pressure toward the member 1 to procure a tight though flexible contact therewith; and that the effect of this packing will be to procure an absolutely fluid-tight joint.

The rings R, R' are, as above indicated, composed of a rigid or hard material which will enable the radial pressure of the soft fibrous packing material to be reduced on the member 1 and to be transferred against the box, thus avoiding a scoring by such fibrous material of said member 1.

It will be seen, furthermore, that in packing against liquid-pressure I provide a cushion against such liquid pressures between the metallic rings and the follower or gland.

It will be seen, furthermore, that by the use of a packing composed partly of rings of a rigid material such as Babbitt-metal, bronze or other non-ferrous metal and partly of rings of a soft material such as fibrous composition, asbestos, rubber composition and the like, the metallic packing ring having the bevelled sides, will be capable also of utilizing the pressures of the liquid, such as hydraulic pressure, to increase the tightness of the seal on the one hand between the metallic ring and the member and on the other hand between the soft packing and the stuffing box, and that the combination of these seals will result in an effective liquid-tight packing which will not mark or score the member packed and will have extraordinary wearing qualities.

In the preferred form of my invention shown, I preferably provide each of the abutting contact surfaces 12 and 13 with grooves 12', 13' and insert within this groove a dowel 19. This grooving and dowelling enables a more accurate registration of the segments of the ring; guides the sliding movements of the aforesaid contact surfaces and by breaking up the flat sliding and sealing surfaces 12 and 13 provides an additional sealing means and, furthermore, produces a more simple, practical and economical method of manufacturing or producing the tangential joints between the segments.

Having described my invention, I claim:—

1. A packing ring composed of a plurality of segments divided from each other along lines substantially tangential to the inner bore of the ring, to provide said segments with abutting sliding surfaces of increased compensating movement and area, each of said segments having one of its two ends shorter than the abutting end of an adjacent segment to prevent projection upon wear of the ring, said segmental ring also having a side bevelled surface, a spring arranged about the periphery of said segmental ring, and the abutting sliding surfaces being provided with semi-circular cooperating grooves having a common dowel seated therein.

2. A packing ring composed of a plurality of segments divided from each other along lines substantially tangential to the inner bore of the ring to provide said segments with abutting-sliding surfaces, said segmental ring having a bevelled surface of not more than 30° with respect to the plane of the ring whereby external adjusting pressure may be applied axially to said ring to cause said segments to be held in close engagement with a shaft without binding.

3. A packing ring composed of a plurality of segments divided from each other along lines substantially tangential to the inner bore of the ring to provide said segments with abutting-sliding surfaces, each segment being of less length than semi-circular extent, and said segmental ring having a bevelled surface of not more than 30° with respect to the plane of the ring whereby external adjusting pressure may be applied axially to said ring to cause said segments to be held in close engagement with a shaft without binding.

4. A packing for rotating and reciprocating members embodying, in combination, a stuffing box, a ring of relatively hard material formed of a plurality of segments, each segment being of less length than semi-circular extent and said segments being divided from each other along rectilinear lines tangential to the inner bore of the ring, one face of said ring having a bevel of not more than 30° with respect to the plane of the ring, and means for producing axial adjusting pressure on said ring, comprising a gland and a flexible and compressible packing whereby said bevel surface and said flexible packing co-operate to hold said hard material ring in close engagement with the packed member without binding.

5. A packing for rotating and reciprocating members embodying, in combination, a stuffing box, a ring of relatively hard material formed of a plurality of segments, each segment being of less length than semi-circular extent and said segments being divided from each other along rectilinear lines tangential to the inner bore of the ring, one face of said ring having a bevel of not more than 30° with respect to the plane of the ring, and a spring arranged about the periphery of said segmental ring, means for producing axial adjusting pressure on said ring, comprising a gland and a flexible and compressible packing whereby said bevel surface and said flexible packing and said spring co-operate to hold said hard material ring in close engagement with the packed member without binding.

6. A packing for rotating and reciprocating members, embodying, in combination, a stuffing box, a pair of rings of relatively hard material having abutting faces, each ring formed of a plurality of segments, each segment being of less than semi-circular extent, and said segments being divided from each other along rectilinear lines tangential with the inner bore of the ring, the other faces of said rings each having a bevel of not more than 30° with respect to the plane of the ring, and means for producing axial pressure on said ring comprising a gland and a flexible and compressible packing whereby said bevel surfaces and said flexible packing co-operate to hold said hard material rings in close engagement with the packed member without binding.

JOHN MELLOR.